United States Patent [19]

Herscovici

[11] 4,270,410
[45] Jun. 2, 1981

[54] GEARBOX WITH HIGH SPEED FLYWHEEL

[75] Inventor: Saul Herscovici, Waterloo, Iowa

[73] Assignee: Power Engineering and Manufacturing, Ltd., Waterloo, Iowa

[21] Appl. No.: 14,700

[22] Filed: Feb. 23, 1979

[51] Int. Cl.³ ............................................. F16H 37/06
[52] U.S. Cl. ................................... 74/665 Q; 74/572
[58] Field of Search ............. 74/572, 665 G, 665 GA, 74/665 GD, 665 Q

[56] References Cited

U.S. PATENT DOCUMENTS

| | | | |
|---|---|---|---|
| 2,946,234 | 7/1960 | Jahnke | 74/665 GD X |
| 3,067,847 | 12/1962 | Beach | 74/572 X |
| 3,665,788 | 5/1972 | Nyman | 74/572 X |

FOREIGN PATENT DOCUMENTS 618761  3/1961  Italy ......................................... 74/665

Primary Examiner—Wm. Carter Reynolds
Attorney, Agent, or Firm—Zarley, McKee, Thomte, Voorhees & Sease

[57] ABSTRACT

A speed reducer gearbox includes input, intermediate and output shafts rotatably mounted therein and a flywheel mounted for independent rotation about the intermediate shaft. The flywheel includes a toothed gear portion in mesh with an additional gear on the input shaft whereby the flywheel is rotated in response to rotation of the input shaft. The flywheel toothed gear portion and additional gear on the input shaft are of relative sizes such that the flywheel is rotated at a higher angular velocity than the input shaft.

8 Claims, 2 Drawing Figures

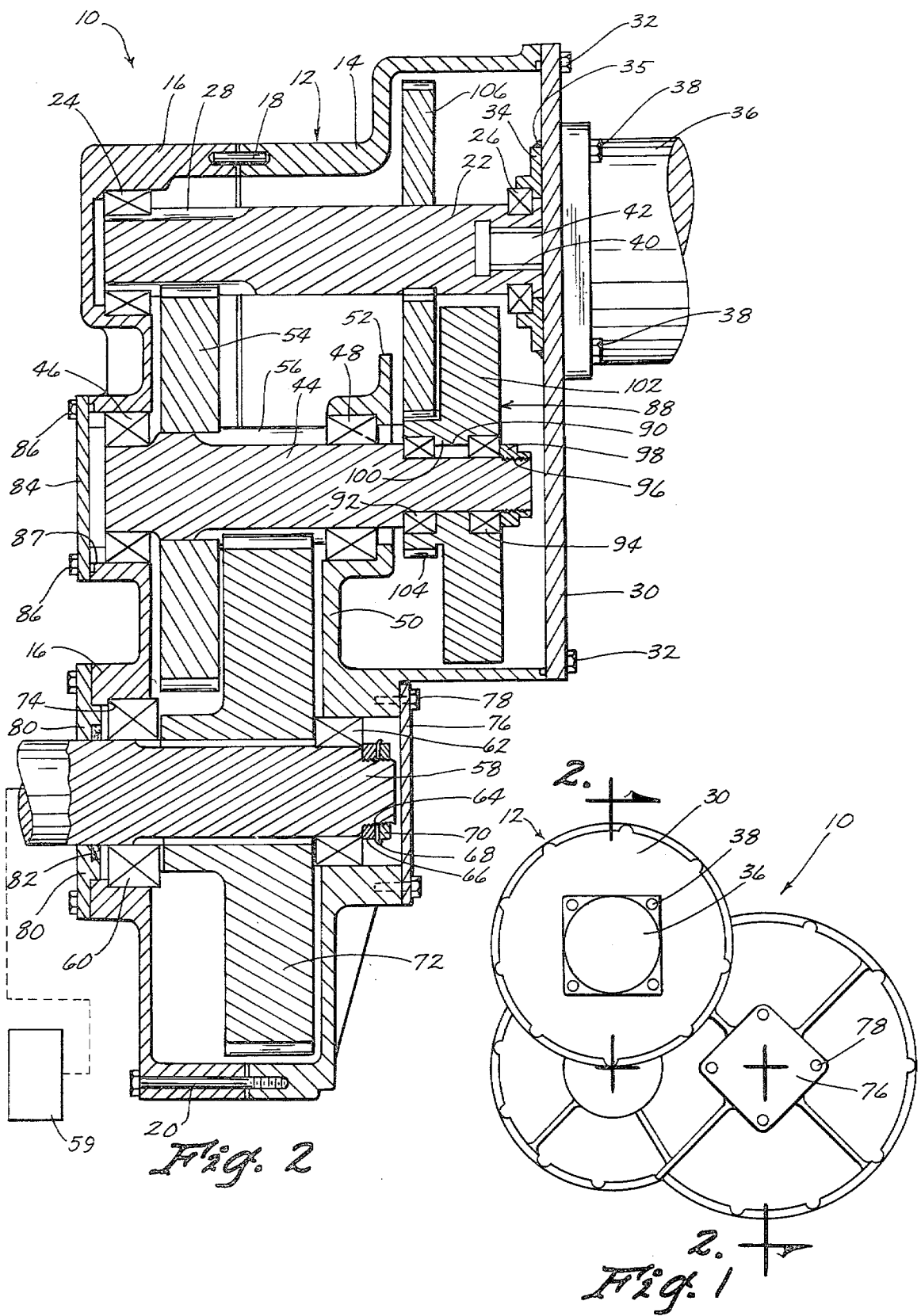

GEARBOX WITH HIGH SPEED FLYWHEEL

BACKGROUND OF THE INVENTION

This invention relates to an improvement to a speed reducer gearbox having a flywheel mounted therein and more particularly to a flywheel independently rotatably mounted on one of the shafts of the gearbox and connected by gear means to another shaft for rotation of the flywheel at a higher angular velocity than the other shaft.

In a speed reducer gearbox, a flywheel may be secured to one of the shafts to provide inertia for stabilizing and smoothing out the operation of the gearbox. Since the input shaft usually rotates at the greatest angular velocity, the flywheel would generally be mounted on that shaft. For heavy-duty work, it is desirable to provide a flywheel of greater diameter or of increased thickness to dampen the heavy impact loads applied to the output shaft. For example, in a highway miller machine wherein carbide tips are mounted on the operating member thereof for chopping up cement, the alternatives are to provide a more powerful engine or to increase the effectiveness of the gearbox flywheel to accommodate the repeated impact loads expected on such a machine. But providing a more powerful engine involves greater expense and increasing the effectiveness of the gearbox flywheel would generally require a gearbox of increased size. Thus there is a need for a speed reducer gearbox having a more efficient flywheel operable within minimum space requirements.

Accordingly, it is a principal object of the invention to provide a more efficient flywheel for a speed reducer gearbox.

A further object of the invention is to provide a speed reducer gearbox having a flywheel operable within a minimum space.

A further object of the invention is to provide a speed reducer gearbox in which a flywheel is adapted to rotate at a greater angular velocity than the shaft to which it is operatively connected.

A further object of the invention is to provide a speed reducer gearbox in which a flywheel is rotatably mounted on one shaft and drivingly connected to another shaft thereof.

A further object of the invention is to provide a speed reducer gearbox having a flywheel mechanism which is simple in construction, durable in use and efficient in operation.

SUMMARY OF THE INVENTION

The speed reducer gearbox of the present invention includes input, intermediate and output shafts rotatably mounted therein, reduction gears for rotating the shafts at decreasing angular velocities and a flywheel mounted on the intermediate shaft to stabilize and smooth out the operation of the gearbox. The flywheel however is not fixed to the intermediate shaft but rather is mounted for rotation relative to the intermediate shaft. A toothed gear portion of the flywheel is disposed in meshed relation with a large gear on the input shaft so that the flywheel is rotated in response to rotation of the input shaft and at a greater angular velocity than the input shaft. Thus, the present invention provides a means for substantially increasing the inertia of a flywheel with practically no increase in size. Whereas the flywheel is rotatably supported on the slower intermediate shaft, it is drivingly connected by suitable gears to the input shaft for rotation at a greater angular velocity than that of the input shaft. The resultant increased efficiency of the speed reducer gearbox due to the high speed flywheel therein enables heavy-duty work to be performed by a smaller engine and at less expense than would otherwise be required.

BRIEF DESCRIPTION OF THE DRAWINGS

FIG. 1 is an end view of the gearbox of this invention; and

FIG. 2 is an enlarged sectional view taken along line 2—2 in FIG. 1.

DESCRIPTION OF THE PREFERRED EMBODIMENT

Referring to the drawings, the speed reducer gearbox of the present invention is indicated generally at 10 and includes an iron casing 12 made up of input and output casing portions 14 and 16 respectively which are secured together by dowel pins 18 and bolt 20.

An input shaft 22 is rotatably mounted in bearings 24 and 26 and includes a helical toothed gear portion 28 formed thereon. A flywheel cover 30 is secured to the input casing half 14 by bolts 32 and includes a bearing support housing 34 welded interiorly thereof as at 35 to provide support for bearing 26. A hydraulic motor 36 is secured by bolts 38 to flywheel cover 30. The input end of shaft 22 is provided with a splined bore 40 which is adapted to receive the output shaft 42 of hydraulic motor 36 when the motor is secured to the flywheel cover as shown.

An intermediate shaft 44 is also mounted in casing 12 and is rotatably mounted in bearings 46 and 48 which are supported on the respective casing halves 16 and 14. For this purpose, it can be seen that input casing portion 14 includes an upstanding wall portion 50 on which an annular bearing support flange 52 is integrally formed. A helical gear 54 is fixed onto intermediate shaft 44 for rotation therewith and is arranged in meshed relation with the toothed gear portion 28 of input shaft 22. Intermediate shaft 44 also has a toothed gear portion 56 formed thereon.

An output shaft 58 is rotatably mounted in casing 12 by bearings 60 and 62. The inner end of output shaft 58 is threaded as at 64 for receiving a spacer ring 66, lock washer 68 and lock nut 70 thereon. Spacer ring 66 abuts against bearing 62 to axially position the same on the output shaft 58.

A large helical gear 72 is fixed on output shaft 58 which is adapted to be connected to a driven member as diagrammatically indicated at 59 for rotation therewith and is axially positioned between bearings 62 and 60, the latter of which engages an interior annular shoulder 74 of output casing portion 16. Gear 72 is arranged in meshed relation with the toothed gear portion 56 of intermediate shaft 44.

Access to the inner end of output shaft 58 may be obtained by removing cover plate 76 which is secured to the input casing portion 14 by bolts 78. Likewise, the exterior end of output shaft 58 is rotatable within an oil seal cover 80 which carries an oil seal 82. Another cover plate 84 is secured to the output casing portion 16 by bolts 86 to cover the access opening 87 for the intermediate shaft 44.

Rotation of input shaft 22 by hydraulic motor 36 causes gear 54 to be rotated which in turn causes intermediate shaft 44 to be rotated. Rotation of intermediate shaft 44 causes rotation of gear 72 which in turn rotates output shaft 58. The size of the various gears from the input shaft 22 through the output shaft 58 results in the angular velocity of the output shaft being less than the angular velocity of input shaft 22. The above-described general arrangement of gears to effect a speed reduction from the input shaft 22 to the output shaft 58 is generally well known in the art.

Applicant's invention is directed to the provision of a high speed flywheel which is operatively connected by gears to one of the shafts of the gearbox 10. Specifically, referring to FIG. 2, a flywheel 88 is rotatably supported on a turned down end portion 90 of intermediate shaft 44 by bearings 92 and 94. To axially position flywheel 88 on intermediate shaft 44, the turned down end portion is externally threaded at 96 to receive a lock nut 98. The lock nut 98 bears against bearing 94 which in turn engages an internal annular shoulder 100 of flywheel 88. Shoulder 100 engages bearing 92 which is seated at the inner end of turned down end portion 90.

Flywheel 88 is shown as an integral member including a flywheel portion 102 and a toothed gear portion 104 which extends axially inwardly from the flywheel portion 102 as shown. Flywheel portion 102 is of substantially greater diameter than the toothed gear portion 104.

An additional relatively large diameter gear 106 is fixed onto the input shaft 22 for rotation therewith. Gear 106 is arranged in meshed relation with the toothed gear portion 104 of flywheel 88 for rotating the flywheel in response to rotation of the input shaft 22. It can be seen however that due to the relative sizes of gears 106 and toothed gear portion 104, that the flywheel 88 is rotated at a substantially greater angular velocity than the input shaft 22. Preferred ratios of the flywheel velocity to the velocity of gear 106 are 2/1 and 3/1.

In operation, hydraulic motor 36 rotates the input shaft 22 at a certain angular velocity which results in the intermediate shaft 44 being rotated at a lesser angular velocity and output shaft 58 being rotated at a still lesser angular velocity. The flywheel 88, on the other hand, is rotated at a substantially greater angular velocity than both the intermediate shaft 44 on which it is rotatably mounted and the input shaft 22 to which it is drivingly connected by gear 106. Since the kinetic energy of a flywheel is calculated as being one-half of the product of the moment of inertia for the flywheel times the square of the angular velocity thereof, or $$E_K = \tfrac{1}{2} I w^2$$

$E_K$—kinetic energy
I—moment of inertia
w—angular velocity it can be seen that increasing the angular velocity of the flywheel is a most efficient way to increase the kinetic energy developed by the flywheel.

Although a preferred embodiment of the invention has been shown herein, it will be readily understood that many alternatives, modifications and variations may be made without departing from the broad scope of the appended claims. For example, the flywheel may be mounted on one of the other shafts of the gearbox or on the gearbox casing independently of the gear supporting shafts. Likewise, the gear which operatively connects the flywheel to one of the shafts may be arranged on a shaft other than input shaft 22 although the latter is preferred because it rotates at the greatest angular velocity.

Thus there has been shown and described a gearbox with a high speed flywheel which accomplishes at least all of the stated objects.

What is claimed is:

1. A speed reducer gearbox comprising,
   a housing means,
   an input shaft rotatably mounted in said housing means and adapted to be connected to a power source, said input shaft having a toothed gear means thereon,
   an intermediate shaft rotatably mounted in said housing means and having a first toothed gear means thereon which is in mesh with said toothed gear means on said input shaft, said intermediate shaft having a second toothed gear means thereon,
   an output shaft rotatably mounted in said housing means and adapted to be connected to a driven member, said output shaft having a toothed gear means thereon which is in mesh with said second toothed gear means of said intermediate shaft,
   a flywheel,
   means for rotatably mounting said flywheel in said housing means,
   said flywheel including a flywheel portion and a toothed gear portion rotatable in unison, and
   additional toothed gear means on one of said shafts, said additional toothed gear means being in mesh with said flywheel toothed gear portion and of such relative size that said flywheel is rotated at a higher angular velocity than said one shaft,
   said flywheel being rotatably supported on another one of said shafts.

2. The gearbox of claim 1 wherein said means for rotatably mounting said flywheel comprises bearing means on said other shaft, said flywheel being mounted on said bearing means for rotation relative to said other shaft.

3. The gearbox of claim 2 wherein said additional toothed gear means is mounted on said input shaft and said flywheel is rotatably supported on said intermediate shaft.

4. The gearbox of claim 3 wherein said toothed gear means on said shafts are of such relative sizes that said intermediate shaft is rotated at a lower angular velocity than said input shaft and said output shaft is rotated at a lower angular velocity than said intermediate shaft.

5. The gearbox of claim 1 wherein said flywheel toothed gear portion is extended axially from said flywheel portion.

6. The gearbox of claim 1 wherein said flywheel portion has a larger diameter than said flywheel toothed gear portion.

7. A speed reducer gearbox comprising,
   a housing means,
   an input shaft rotatably mounted in said housing means and adapted to be connected to a power source,
   an output shaft rotatably mounted in said housing means and adapted to be connected to a driven member,
   reduction gear means within said housing operatively connecting said input shaft and output shaft for rotation of said output shaft at a lower angular velocity than said input shaft,
   a flywheel, means for rotatably mounting said flywheel on said housing means, said flywheel including a toothed gear portion thereon, and additional toothed gear means on said input shaft, said additional toothed gear means being in mesh with said flywheel toothed gear portion and of such relative size that said flywheel is rotated at a higher angular velocity than said input shaft.

8. A speed reducer gearbox comprising, a housing means, an input shaft rotatably mounted in said housing means and adapted to be connected to a power source, an output power means rotatably mounted in said housing means and adapted to be connected to a driven member, reduction gear means within said housing operatively connecting said input shaft and output power means for rotation of said output power means at a lower angular velocity than said input shaft, p1 a flywheel, means for rotatably mounting said flywheel on said housing means, said flywheel including a toothed gear portion thereon, and additional toothed gear means on said input shaft, said additional toothed gear means being in mesh with said flywheel toothed gear portion and of such relative size that said flywheel is rotated at a higher angular velocity than said input shaft.

* * * * *